United States Patent
Li et al.

(10) Patent No.: US 9,929,768 B2
(45) Date of Patent: Mar. 27, 2018

(54) SYSTEM AND METHOD FOR TDD-FDD DUPLEXING IN A RADIO ARCHITECTURE

(71) Applicants: Lin Li, Lachine (CA); Ke Wu, Montreal (CA)

(72) Inventors: Lin Li, Lachine (CA); Ke Wu, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 14/605,620

(22) Filed: Jan. 26, 2015

(65) Prior Publication Data

US 2016/0218767 A1    Jul. 28, 2016

(51) Int. Cl.
- *H04B 1/401* (2015.01)
- *H04B 1/44* (2006.01)
- *H04L 5/14* (2006.01)
- *H04L 5/26* (2006.01)

(52) U.S. Cl.
CPC ............. *H04B 1/401* (2013.01); *H04B 1/44* (2013.01); *H04L 5/14* (2013.01); *H04L 5/26* (2013.01)

(58) Field of Classification Search
CPC ............. H04B 1/401; H04L 5/14; H04L 5/26
USPC ........................................................ 370/278
See application file for complete search history.

(56) References Cited

U.S. PATENT DOCUMENTS

| | | | |
|---|---|---|---|
| 7,664,534 B1* | 2/2010 | Johnson | H04B 7/2606 455/13.1 |
| 8,385,305 B1* | 2/2013 | Negus | H04W 76/025 370/310 |
| 2002/0090974 A1* | 7/2002 | Hagn | H04B 1/005 455/552.1 |
| 2005/0170789 A1* | 8/2005 | Consolazio | H04B 1/408 455/78 |
| 2007/0021080 A1 | 1/2007 | Kuriyama et al. | |
| 2009/0184860 A1* | 7/2009 | Chan | H04L 1/20 342/21 |

(Continued)

OTHER PUBLICATIONS

International Search Report of Corresponding International Application No. PCT/CN2015/096570 dated Mar. 10, 2016.

(Continued)

*Primary Examiner* — Edan Orgad
*Assistant Examiner* — Emmanuel Maglo
(74) *Attorney, Agent, or Firm* — Gowling WLG (Canada) LLP

(57) ABSTRACT

A reconfigurable TDD-FDD multiplexer operates in a TDD mode and a FDD mode. The TDD-FDD multiplexer includes an interdigital quadruplexer in series with a one-pole three-throw RF switch. The interdigital quadruplexer includes of two V-band filters, connectable to a transmitter and a receiver, respectively, for TDD mode duplexing, and two E-band filters, connectable to a transmitter and a receiver, respectively, for FDD mode duplexing. The E-band filters include an E-band transmitting filter that passes an E-band transmitting frequency band, and an E-band receiving filter that passes for an E-band receiving frequency band offset from the E-band transmitting frequency band. Switching between the V-band receiving filter and V-band transmitting filter enables TDD duplexing functionality at V-band frequencies. Switching to the two E-band filters enables FDD duplexing functionality at E-band frequencies.

20 Claims, 4 Drawing Sheets

(56) References Cited

U.S. PATENT DOCUMENTS

| | | | |
|---|---|---|---|
| 2011/0075593 A1 | 3/2011 | Chen et al. | |
| 2012/0202561 A1 | 8/2012 | Robinett | |
| 2012/0243447 A1 | 9/2012 | Weissman et al. | |
| 2013/0044028 A1* | 2/2013 | Lea | H01Q 21/24 342/359 |
| 2013/0188529 A1 | 7/2013 | Poulin et al. | |
| 2013/0273974 A1* | 10/2013 | Lea | H01Q 21/24 455/562.1 |
| 2014/0016525 A1 | 1/2014 | Yoshizawa | |
| 2014/0313947 A1 | 10/2014 | Ali-Ahmad | |
| 2014/0321282 A1* | 10/2014 | Pragada | H04W 36/0072 370/235 |
| 2015/0073642 A1* | 3/2015 | Widmer | G01C 21/36 701/22 |
| 2015/0188592 A1* | 7/2015 | Solondz | H04B 1/3888 455/501 |
| 2015/0303951 A1* | 10/2015 | Zhou | H04B 1/0057 370/280 |
| 2016/0134414 A1* | 5/2016 | Pehlke | H04B 1/0057 370/280 |
| 2016/0149690 A1* | 5/2016 | Khlat | H04W 72/0446 370/280 |

OTHER PUBLICATIONS

Athanasopoulos et al., "A 60 GHz Planar Diplexer Based on Substrate Integrated Waveguide Technology", Hindawi Publishing Corporation, Active and Passive Electronic Components, Jan. 2013, 6 pages.

Kuroki et al., "Filter-based NRD-guide duplexer with low loss and high isolation at 60 GHz", Electronics Letters, Jun. 24, 2004, vol. 40, No. 13, pp. 808-810.

Maeng et al., "W-Band Cross-Coupled Filters and a Duplexer on a Thin-Film Substrate for Low-Cost Front-End Integration", IEEE Electronic Components and Technology Conference, May 26-29, 2009, pp. 1594-1598.

Pan et al., "A Low-Loss Substrate-Independent Approach for 60-GHz Transceiver Front-End Integration Using Micromachining Technologies", IEEE Transactions on Microwave Theory and Techniques, Dec. 2008, vol. 56, No. 12, pp. 2779-2788.

Saitou et al. "Tunable Duplexer Having Multilayer Structure Using LTCC", Microwave Symposium Digest, Jun. 8-13, 2003, IEEE MTT-S International. vol. 3, pp. 1763-1766.

Sundaram et al., "A Novel Electronically Tunable Active Duplexer For Wireless Transceiver Applications", IEEE Transactions On Microwave Theory and Techniques, Jun. 2006, vol. 54, No. 6, pp. 2584-2592.

Kawai et al., "Tunable Ring Resonator Filter For Duplexer", Proceedings of the 38th European Microwave Conference, Oct. 27-31, 2008, pp. 603-606.

Alekseev et al., "InGaAs PIN Diodes for High-Isolation W-Band Monolithic Integrated Switching Applications", High Speed Semiconductor Devices and Circuits, Aug. 4-6, 1997, pp. 332-340.

Tsai et al., "Analysis and Design of Bandpass Single-Pole-Double-Throw FET Filter-Integrated Switches", IEEE Transactions On Microwave Theory and Techniques, Aug. 2007, vol. 55, No. 8, pp. 1601-1610.

Chao et al., "A 50 to 94-GHz CMOS SPDT Switch Using Traveling-Wave Concept", IEEE Microwave and Wireless Components Letters, Feb. 2007, vol. 17, No. 2, pp. 130-132.

Supplementary European Search Report on Application EP 1587 9718 dated Jan. 8, 2018.

* cited by examiner

SYSTEM AND METHOD FOR TDD-FDD DUPLEXING IN A RADIO ARCHITECTURE

TECHNICAL FIELD

The present disclosure relates a system and method for TDD-FDD duplexing in a radio architecture.

BACKGROUND

Wireless backhaul communication systems may be utilized to provide point to point communication between two or more endpoints such as, for example, buildings. Wireless backhaul communication systems may utilize microwave wavelengths, which enable rapid and low-cost deployment and provide high speed wireless communication between the cells of a backhaul system.

In microwave radio communication, signals may be transmitted and received utilizing time-division duplexing (TDD) or frequency-division duplexing (FDD). In TDD, the transmitted and received signals utilize the same frequency, requiring switching in time between a transmitter and a receiver. In FDD, the transmitted and received signals utilize different frequencies, separated by a defined frequency offset, enabling simultaneous transmitting and receiving signals.

Prior art duplexers operate in one or the other of a TDD or a FDD mode. However, in wireless backhaul communication systems, it may be desired to transmit and receive utilizing both TDD and FDD. Thus, a single duplexer that may operate utilizing both TDD and FDD is desired.

SUMMARY

In a first aspect, there is provided a multiplexer includes a first band pass filter having a first frequency passband and a first port for coupling to a first transmitter, a second band pass filter having a second frequency passband and a first port for coupling to a second transmitter, a third band pass filter having a third frequency passband that is offset from the second frequency passband, and a first port for coupling to a first receiver, a fourth band pass filter having a fourth frequency passband, and a first port for coupling to a second receiver, and a switch for coupling an antenna to a second port of the first band pass filter in a first switch position, both a second port of the second band pass filter and a second port of the third band pass filter in a second switch position, and a second port of the fourth band pass filter in a third switch position.

In a further aspect, the switch is configured to be positioned in in a time division duplexing (TDD) mode, the first switch position during signal transmitting and the third switch position during signal receiving, and in a frequency division duplexing (FDD) mode, the second switch position.

In a further aspect, the first frequency passband and the fourth frequency passband are substantially the same.

In a further aspect, the second and third frequency passbands are offset from the first and fourth frequency passbands.

In a further aspect, the first and fourth frequency passbands are in a V-band frequency range of about 57 GHz to about 66 GHz.

In a further aspect, the second frequency passband is a first E-band frequency range of about 71 GHz to about 76 GHz and the third frequency passband is a second E-band frequency range of about 81 GHz to about 86 GHz.

In a further aspect, the second frequency passband is a first E-band frequency range of about 81 GHz to about 86 GHz and the third frequency passband is a second E-band frequency range of about 71 GHz to about 76 GHz.

In a further aspect, the switch is a three-throw one-pole switch.

In a further aspect, the first transmitter and the second transmitter are a single transmitter.

In a further aspect, the first receiver and the second receiver are a single receiver.

In another aspect, there is provided a method including determining whether to operate in a time-division duplexing (TDD) mode or a frequency division duplexing (FDD) mode, when the determination is to operate in the TDD mode during signal transmitting, coupling an antenna to a first transmitter via a first band pass filter having a first frequency passband, during signal receiving, coupling the antenna to a second receiver via a fourth band pass filter having a fourth frequency passband, and when the determination is to operate in the FDD mode, simultaneously coupling the antenna to a second transmitter via a second band pass filter having a second frequency passband and to a first receiver via a third band pass filter having a third frequency passband offset from the second frequency passband.

In a further aspect, the method includes switching between signal transmitting and signal receiving in the TDD mode based on a predetermined TDD timing scheme.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
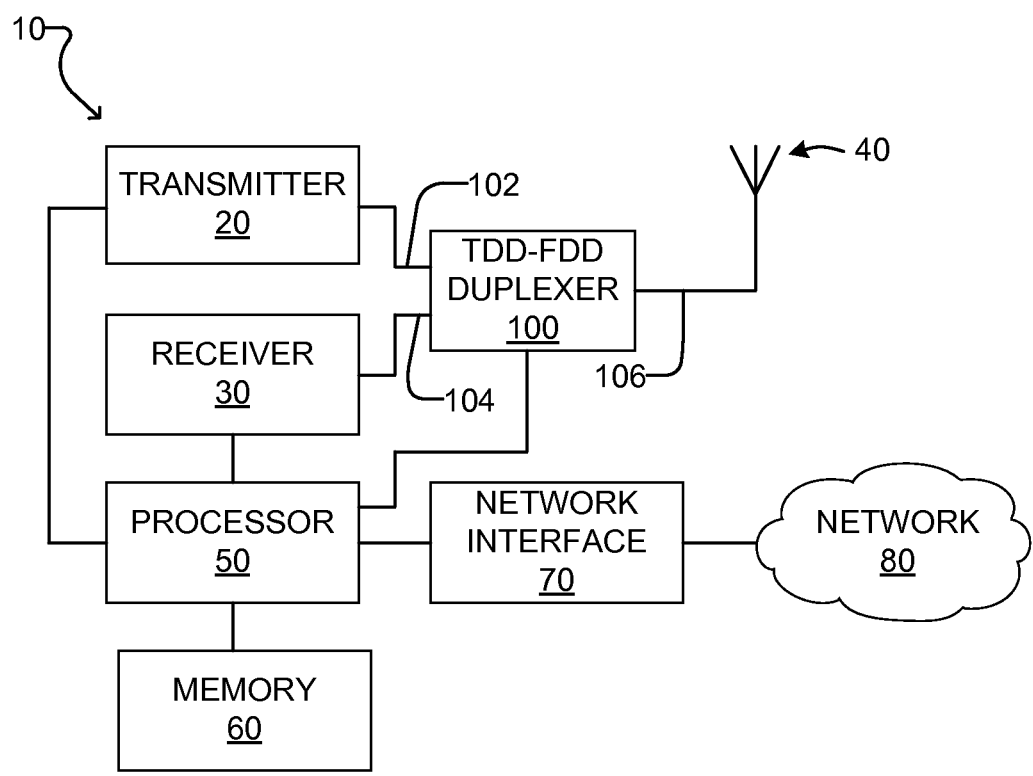
FIG. 1 is a block diagram of a wireless communication system according to an embodiment.

Generally, the present disclosure provides a method and system for a reconfigurable multiplexer that operates in a TDD mode and a FDD mode. According to an embodiment, the multiplexer is a TDD-FDD duplexer that includes an interdigital quadruplexer in series with a one-pole three-throw RF switch. The interdigital quadruplexer includes two V-band filters, connectable to a transmitter and a receiver, respectively, for TDD mode duplexing, and two E-band filters, connectable to a transmitter and a receiver, respectively, for FDD mode duplexing. The E-band filters include an E-band transmitting filter that passes an E-band transmitting frequency band, and an E-band receiving filter that passes for an E-band receiving frequency band offset from the E-band transmitting frequency band. Switching between the V-band receiving filter and V-band transmitting filter enables TDD duplexing functionality at V-band frequencies. Switching to the two E-band filters enables FDD duplexing functionality at E-band frequencies.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Referring to FIG. 1, a wireless communication system 10 for transmitting and receiving information in, for example, a wireless backhaul communication system is shown. The wireless communication system 10 includes a transmitter 20, a receiver 30, an antenna 40 coupled to the transmitter 20 and receiver 30 via a TDD-FDD duplexer 100 according to an embodiment. The TDD-FDD duplexer 100 has a transmitter port 102 for coupling to the transmitter 20, a receiver port 104 for coupling to the receiver 30, and an antenna port 106 for coupling to the antenna 40.

The transmitter 20 and receiver 30 may be configured to transmit and receive signals in various frequency bands. For example, the transmitter 20 and the receiver 30 may be configured to transmit and receive signals in either of the V-band and E-band. The V-band frequency range utilized may be from 57-66 GHz and the E-band frequency range utilized maybe from 71-76 GHz and 81-86 GHz. Due to channelization characteristics, TDD transmitting/receiving is a more suitable duplexing method for communications in the V-band, and FDD transmitting/receiving is a more suitable duplexing method for communications in the E-band.

In order to provide both for TDD transmitting/receiving, for example in the V-band, and FDD transmitting/receiving, for example in the E-band, the TDD-FDD duplexer 100 is reconfigurable to operate in either of a TDD duplexing mode or a FDD duplexing mode to provide both TDD and FDD duplexing functionality, as described in more detail below.

The wireless communication system also includes a processor 50 operatively coupled to the transmitter 20, the receiver 30, and the TDD-FDD duplexer 100. The processor 50 is also operatively coupled to a memory 60. The processor 50 may control the overall operation of the wireless communication system 10 including, for example, controlling the TDD-FDD duplexer 100 in either of the TDD duplexing mode and FDD duplexing mode.

The processor 50 may comprise any type of electronic data processor. The memory 60 may comprise any type of system memory such as static random access memory (SRAM), dynamic random access memory (DRAM), synchronous DRAM (SDRAM), read-only memory (ROM), a combination thereof, or the like. In an embodiment, the memory 70 may include ROM for use at boot-up, and DRAM for program and data storage for use while executing programs. The memory 70 may also include a storage device configured to store data, programs, and other information and to make the data, programs, and other information available to the processor 50. The storage device may comprise, for example, one or more of a solid state drive, hard disk drive, a magnetic disk drive, an optical disk drive, or the like.

The wireless communication system 10 may also include one or more network interfaces 70, which may comprise wired links, such as an Ethernet cable, and/or wireless links to access nodes or different networks 80. The network interface 70 allows the processing unit to communicate with remote units via the network 80. In an embodiment, the wireless communication system 10 is coupled to a local-area network or a wide-area network for data processing and communications with remote devices, such as the Internet, remote storage facilities, or the like.

Specific wireless communication systems 10 may utilize all of the components shown, or only a subset of the components, and levels of integration may vary from system to system. Furthermore, a wireless communication system 10 may contain multiple instances of a component, such as, for example, multiple processors 50, memories 60, transmitters 20, receivers 30, etc. The wireless communication system 10 may comprise a processor 50 operatively coupled to one or more input/output devices, such as a speaker, microphone, mouse, touchscreen, keypad, keyboard, printer, display, and the like.

Figure 2:
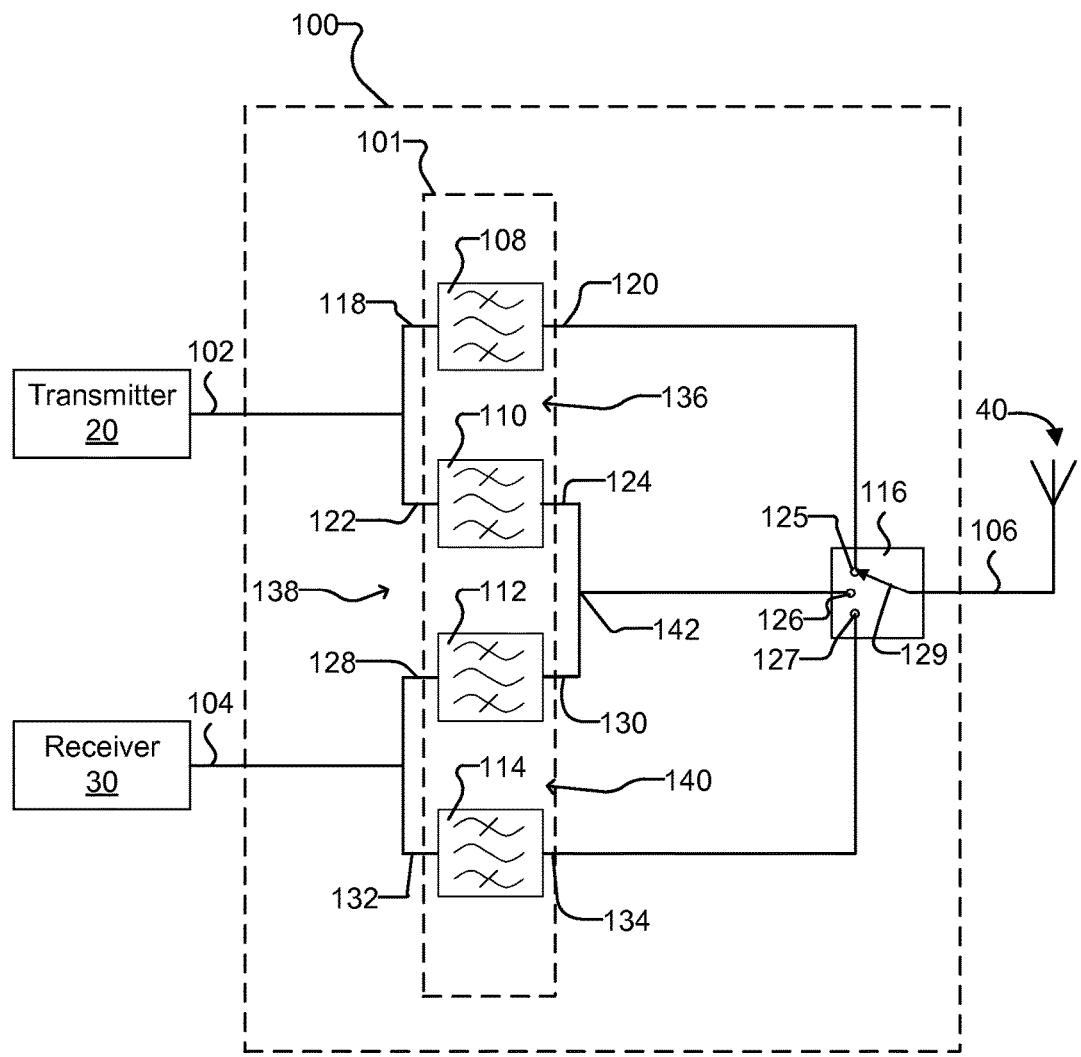
FIG. 2 is a block diagram of an interdigital quadruplexer according to an embodiment.

Referring now to FIG. 2, an example of a TDD-FDD duplexer 100 is shown that provides both TDD and FDD duplexing capabilities. The TDD-FDD duplexer 100 includes a V-band transmitting filter 108, an E-band transmitting filter 110, an E-band receiving filter 112, and a V-band receiving filter 114. The filters 108-114 are configured to pass frequencies within a desired band and filter out frequencies outside the desired bands. The filters 108-114 may be, for example, band pass filters configured to pass frequencies in a desired range, or passband. In some embodiments, the V-band transmitting filter 108 and the V-band receiving filter 114 may have passbands that are substantially the same. The E-band transmitting filter 110 and the E-band receiving filter 112 have passbands that are offset from each other. In some embodiments, the passbands of the E-band transmitting filter 110 and the E-band receiving filter 112 may be offset from the passbands of V-band transmitting filter 108 and the V-band receiving filter 114.

The TDD-FDD duplexer 100 includes a switch 116 in series with the interdigital quadruplexer 101. The switch 116 may be a one-pole three-throw (1P3T) RF switch. The pole 129 of the switch 116 couples to the antenna port 106 of the TDD-FDD duplexer 100.

In an embodiment, the V-band transmitting filter 108 and the V-band receiving filter 114 are configured to pass frequencies in the range of about 57 GHz to about 66 GHz, and filter frequencies outside of this range. The V-band transmitting filter 108 and the V-band receiving filters 114 are utilized in a TDD duplexing mode and, therefore, they may be configured to have substantially the same passband.

The E-band transmitting filter 110 and the E-band receiving filter 112 are utilized in a FDD duplexing mode and, therefore, the passbands each filter 110 and 112 are offset and do not overlap. The passbands of the E-band transmitting filter 110 and the E-band receiving filter 112 may also be offset from the passbands of the V-band transmitting filter 108 and the V-band receiving filter 114. In an embodiment, the E-band transmitting filter 110 is configured to pass frequencies in the range of about 71 GHz to about 76 GHz, and filter frequencies outside of this range; and the E-band receiving filter 112 is configured to pass frequencies in the range of about 81 GHz to about 86 GHz, and filter frequencies outside of this range. In another embodiment, the E-band receiving filter 112 is configured to pass frequencies in the range of about 71 GHz to about 76 GHz, and filter frequencies outside of this range; and the E-band transmitting filter 110 is configured to pass frequencies in the range of about 81 GHz to about 86 GHz, and filter frequencies outside of this range.

Although the filters 108-114 are referred to in terms of V-band and E-band frequencies, in other embodiments these filters may be configured to pass frequencies in bands other than the V-band and E-band.

The V-band transmitting filter 108 includes a first port 118 that may be coupled to the transmitter 20, and a second port 120 that is coupled to the first throw 125 of the switch 116. The E-band transmitting filter 110 includes a first port 122 that may be coupled to the transmitter 20 and a second port 124 that is coupled to the second throw 126 of the switch 116. The E-band receiving filter 112 includes a first port 128 that may be coupled to the receiver 30 and a second port 130 that is coupled to the second throw 126 of the switch 116. The V-band receiving filter 114 includes a first port 132 that may be coupled to the receiver 30 and a second port 134 that is coupled to the third throw 127 of the switch.

Thus, when the TDD-FDD duplexer 100 is included in a wireless communication system 10, such as the wireless communication system 10 shown in FIG. 1, the transmitter 20 is coupled to the first throw 125 of the switch 116 via the V-band transmitting filter 108 and to the second throw 126 of the switch 116 via the E-band transmitting filter 110. The receiver 30 is coupled to the second throw 126 of the switch 116 via the E-band receiving filter 112 and to the third throw 127 of the switch 116 via the V-band transmitting filter 114. The pole 129 of the switch may be coupled to the antenna 40 via the port 106.

In the embodiment shown in FIG. 2, the filters 108-114 are arranged and coupled to form a first diplexer 136, a second diplexer 138, and a third diplexer 140, forming what is referred to herein as an "interdigital quadruplexer" 101.

The V-band transmitting filter 108 and the E-band transmitting filter 110 form the first diplexer 136 such that the common port of the first diplexer 136 is the transmitting port 102 of the TDD-FDD duplexer 100. The E-band transmitting filter 110 and the E-band receiving filter 112 form the second diplexer 138 having a common port 142 that is coupled to the second throw 126 of the switch 116. The V-band receiving filter 114 and the E-band receiving filter 112 form the third diplexer 136 such that the common port of the third diplexer is the receiving port 104.

In operation, the transmitting port 102 is coupled to a transmitter 20, the receiving port 104 is coupled to a receiver 30, and the antenna port 106 is coupled to the antenna 40. As discussed above, the TDD-FDD duplexer 100 may operate in a TDD duplexing mode, providing TDD duplexing functionality, and in a FDD duplexing mode, providing FDD duplexing functionality. The TDD-FDD duplexer is reconfigured between the TDD duplexing mode and the FDD duplexing mode utilizing the switch 116.

In a TDD mode, the pole 129 of the switch 116 is positioned to couple the antenna 40 to the first throw 125 during signal transmitting and to the third throw 127 during receiving. The transmitter 20 transmits a signal in, for example, the V-band frequency range, which passes through the V-band transmitting filter 108, but is substantially blocked by the E-band transmitting filter 110. The transmission signal passes through the switch 116 to the antenna 40 via the pole 129 positioned at the first throw 125.

During receiving in the TDD duplexing mode, the pole 129 of the switch 116 is positioned to couple the antenna 40 to the third throw 127. Received signals in, for example, the V-band frequency range, are received by the antenna 40 and are passed through the switch 116 via the pole 129 positioned at the third throw 127 to the second port 134 of the V-band receiving filter 114. The received V-band frequency signals are passed by the V-band receiver filter 114 to the receiver 30.

During the TDD duplexing mode, the pole 129 of the switch 116 couples to the first throw 125 during signal transmitting, and to the third throw 127 during signal receiving. The switch 116 may be controlled by, for example, the controller 50 that is operatively coupled to the switch 116, the transmitter 20 and the receiver 30. The timing of the switching between the first throw 125 and the third throw 127 may be determined by, for example, properties of the particular TDD scheme utilized. The properties may include, for example, the timing between signal transmitting and signal receiving. The properties of the TDD scheme utilized may be predetermined based on, for example, a communication standard. The processor 50 may, for example, signal to the transmitter 20 to transmit in a TDD mode in a V-band frequency range. Further, the processor 50 may signal to the transmitter 20 that the pole 129 of the switch 116 is positioned at the first throw 125 and that transmission signals can be sent by the transmitter 20.

In a FDD mode, the pole 129 of the switch 116 is positioned to couple the antenna 40 to the second throw 126. During FDD mode, transmitting and receiving occur simultaneously, utilizing a transmitting frequency band that is offset from a receiving frequency band. The transmitter 20 sends a transmission signal in, for example the E-band frequency range, which passes to the V-band transmitting filter 108 and the E-band transmitting filter 110. The transmission signal is passed through the E-band transmitting filter 110, which is configured to pass signals in the transmitting frequency band, but is substantially blocked by the V-band transmitting filter 108. The transmission signal passes from the E-band transmitting filter 110, through the switch 116 via the pole 129 positioned at the second throw 126, to the antenna 40.

Received signals received at the antenna 40 are passed through the switch 116 to the E-band transmitting filter 110 and the E-band receiving filter 112. The received signals are passed by the E-band receiving filter 112 to the receiver 30. The received signals are substantially blocked by the E-band transmitting filter 110 and are inhibited from passing to the transmitter 20. Although transmission signals that pass through the E-band transmitting filter 110 reach the second port 130 of the E-band receiving filter 112, the offset in the frequencies passed by the E-band transmitting filter 110 and the E-band receiving filter 112 inhibit the transmission signal from mixing with the received signals that are passed through the E-band receiving filter 112 to the receiver 30.

Figure 3:
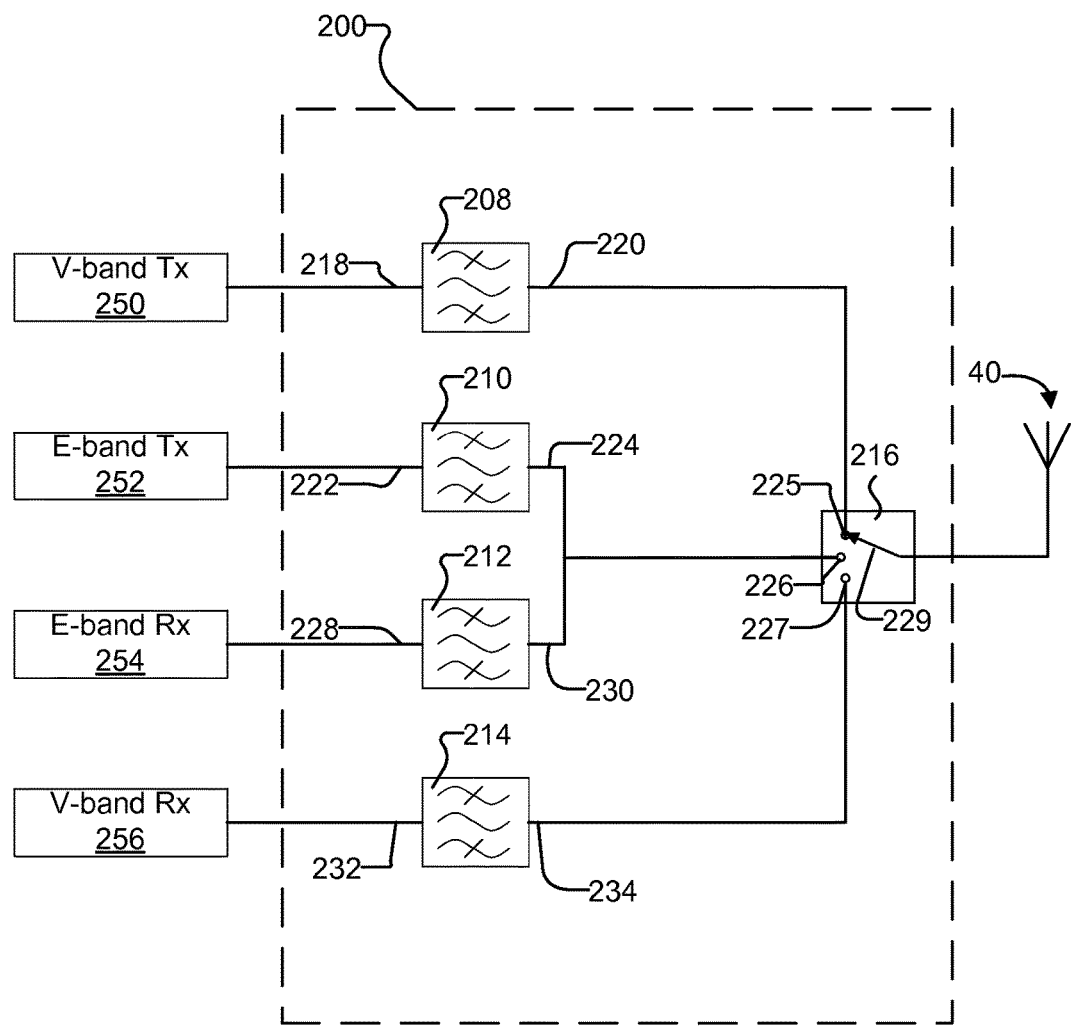
FIG. 3 is a block diagram of an interdigital quadruplexer according to another embodiment.

FIG. 3 shows an alternative embodiment in which the transmitter 20 includes a V-band transmitter 250 and a separate E-band transmitter 252. In this case, a TDD-FDD multiplexer 200 includes a V-band transmitting filter 208 having a first port 218 that couples to the V-band transmitter 250 and an E-band transmitting filter 210 having a first port 222 that couples to the separate E-band transmitter 252.

Further, in the embodiment shown in FIG. 3, the receiver 30 may include an E-band receiver 254 and a separate V-band receiver 256. An E-band receiving filter 212 couples to the E-band receiver 254 by a first port 228 and a V-band receiving filter 214 couples to the separate V-band receiver 256 via a first port 232.

The second port 220 of the V-band transmitting filter 208 is coupled to the first throw 225 of the switch 216. The second port 224 of E-band transmitting filter 210 and the second port of the E-band receiving filter 212 are coupled to the second throw 226 of the switch 216. The second port 234 of the V-band receiving filter 214 is coupled to the third throw 227 of the switch 216. In operation, the pole 229 of the switch 216 is positioned similarly as described above with reference to FIG. 2 and is not described further herein.

Figure 4:
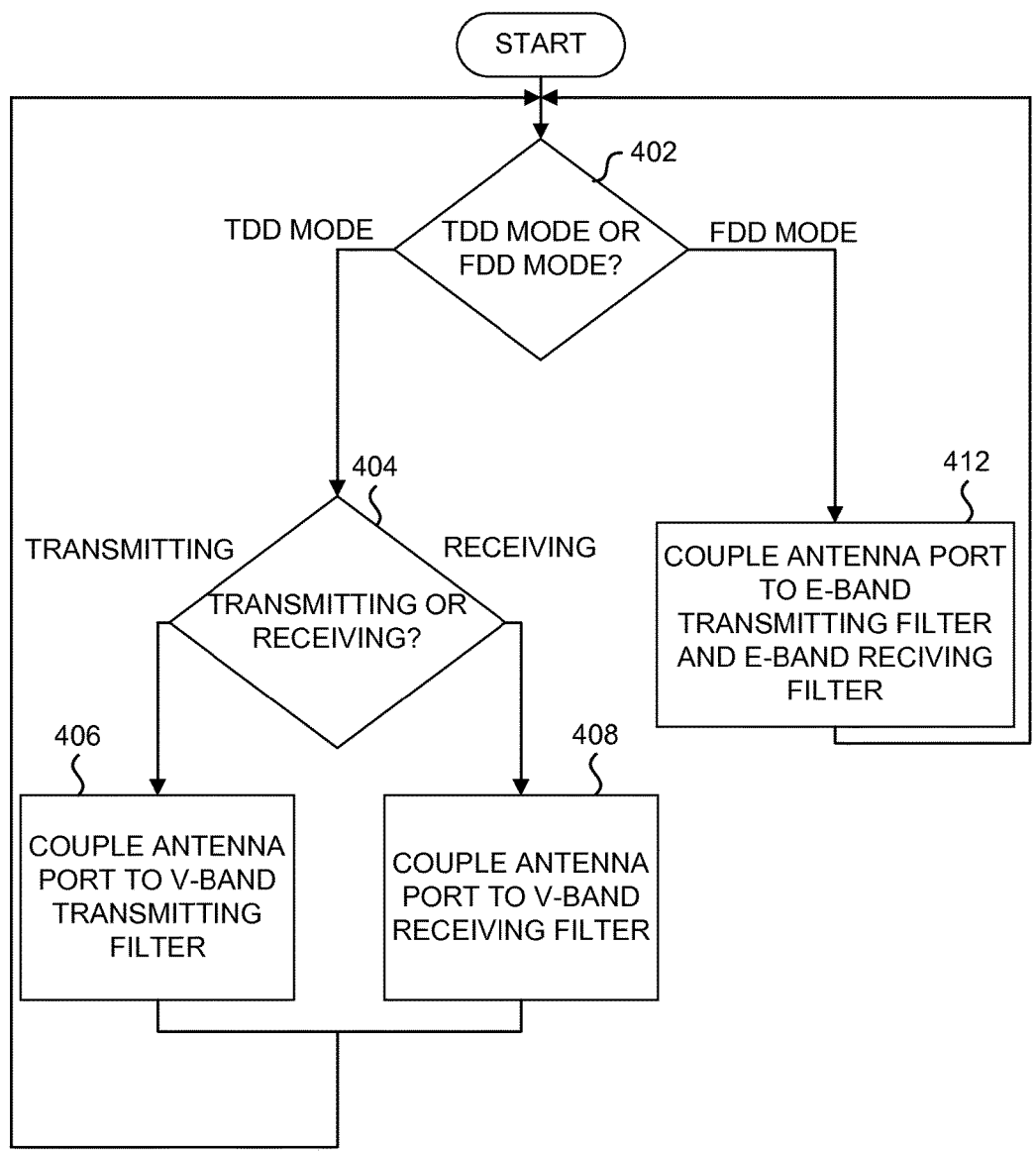
FIG. 4 is a flow chart illustrating a method for controlling an interdigital quadruplexer according to an embodiment.

Referring now to FIG. 4, a flow chart illustrating a method for enabling TDD and FDD duplexing capabilities in a TDD-FDD multiplexer is shown. The method may be carried out by software executed, for example, by the processor 50. Coding of software for carrying out such a method is within the scope of a person of ordinary skill in the art given the present disclosure. The method may contain additional or fewer processes than shown and/or described, and may be performed in a different order. Computer-readable code executable by at least one processor 50 to perform the method may be stored in a computer-readable medium, such as a non-transitory computer-readable medium.

At 402, a determination is made whether the multiplexer is operating in a TDD mode or a FDD mode. If the determination at 402 is that the multiplexer is operating in a TDD duplexing mode, the method continues to 404. At 404, a determination is made whether the multiplexer is transmitting or receiving signals. If the determination at 404 is that the multiplexer is transmitting signals, the method continues to 406 and the antenna is coupled to the V-band transmitting filter. If the determination at 404 is that the multiplexer is receiving signals, the method continues to 408 and the antenna is coupled to the V-band receiving filter. For example, in the TDD-FDD multiplexer shown in FIG. 2, the pole 129 of the switch 116 may be positioned at the first throw 125 during signal transmitting and at the third throw 127 during signal receiving.

After the antenna is coupled to one of the V-band transmitting filter at 406 or the V-band receiving filter at 408, the method returns to 402.

If the determination at 402 is that the multiplexer is operating in a FDD mode, the method continues to 410. At 410, the antenna is coupled to the E-band transmitting filter and the E-band receiving filter by, for example, positioning the pole 129 of the switch 116 to the second throw 126 in the TDD-FDD duplexer 100 shown in FIG. 2. As discussed above, E-band transmitting filter and E-band receiving filter separate the transmission and reception signals due to the frequency offset of the E-band transmitting filter and the E-band receiving filter, enabling transmitting frequency signals to pass to the antenna 40, and receiving frequency signals from the antenna 40 to pass to the receiver 30. After the antenna port is coupled to the E-band transmitting and receiving filters at 410, the method returns to 402.

The TDD-FDD multiplexer may utilize V-band and E-band frequencies. Both FDD and TDD duplexing schemes are widely used in the millimeter wave frequency band communication, including V-band (57-66 GHz), E-band (71-76 GHz and 81-86 GHz).

In the prior art, transceivers operate using one of an FDD duplexer or a TDD duplexer, resulting in a dedicated transceiver that operates utilizing one of FDD or TDD.

The reconfigurable TDD-FDD multiplexer disclosed herein can be switched between operation in the TDD mode and the FDD mode by, for example, positioning a switch in one of the three positions. The TDD-FDD multiplexer and method described herein integrates TDD and FDD functionality in one compact format and simple architecture.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A multiplexer comprising:
   a first band pass filter having a first frequency passband and a first port for coupling to a transmitter for the first frequency passband;
   a second band pass filter having a second frequency passband and a first port for coupling to a transmitter for the second frequency passband;
   a third band pass filter having a third frequency passband that is offset from the second frequency passband, and a first port for coupling to a receiver for the third frequency passband;
   a fourth band pass filter having a fourth frequency passband, and a first port for coupling to a receiver for the fourth frequency passband; and
   a switch for coupling an antenna to:
   when operating in a time division duplexing (TDD) mode:
   a second port of the first band pass filter in a first switch position during signal transmitting; and
   a second port of the fourth band pass filter in a third switch position during signal receiving; and
   when operating in a frequency division duplexing (FDD) mode:
   both a second port of the second band pass filter and a second port of the third band pass filter in a second switch position.

2. The multiplexer according to claim 1, wherein the first frequency passband and the fourth frequency passband are the same.

3. The multiplexer according to claim 2, wherein the second and third frequency passbands are offset from the first and fourth frequency passbands.

4. The multiplexer according to claim 2, wherein the first and fourth frequency passbands are in a V-band frequency range of about 57 GHz to about 66 GHz.

5. The multiplexer according to claim 1, wherein the second frequency passband is a first E-band frequency range of about 71 GHz to about 76 GHz and the third frequency passband is a second E-band frequency range of about 81 GHz to about 86 GHz.

6. The multiplexer according to claim 1, wherein the second frequency passband is a first E-band frequency range of about 81 GHz to about 86 GHz and the third frequency passband is a second E-band frequency range of about 71 GHz to about 76 GHz.

7. The multiplexer according to claim 1, wherein the second and third frequency passbands are offset from the first and fourth frequency passbands.

8. The multiplexer according to claim 1, wherein the switch is a three-throw one-pole switch.

9. The multiplexer according to claim 1, wherein the transmitter for the first frequency passband and the transmitter for the second frequency passband are provided by a single transmitter.

10. The multiplexer according to claim 1, wherein the receiver for the third frequency passband and the receiver for the fourth frequency passband are provided by a single receiver.

11. The multiplexer according to claim 1, wherein:
the first port of the first band filter and the first port of the second band pass filter form a common port of a first diplexer;
the second port of the second band pass filter and the second port of the third band pass filter form a common port of a second diplexer; and
the first port of the third band pass filter and the first port of the fourth band pass filter form a common port of a third diplexer.

12. A method comprising:
determining whether to operate in a time-division duplexing (TDD) mode or a frequency division duplexing (FDD) mode;
when the determination is to operate in the TDD mode:
during signal transmitting, coupling an antenna to a transmitter for a first frequency passband via a first band pass filter having the first frequency passband;
during signal receiving, coupling the antenna to a receiver for a fourth frequency passband via a fourth band pass filter having the fourth frequency passband; and
when the determination is to operate in the FDD mode, simultaneously coupling the antenna to a transmitter for a second frequency passband via a second band pass filter having the second frequency passband and to a receiver for a third frequency passband via a third band pass filter having the third frequency passband offset from the second frequency passband.

13. The method according to claim 12, further comprising switching between signal transmitting and signal receiving in the TDD mode based on a predetermined TDD timing scheme.

14. The method according to claim 12, wherein the first frequency passband and the fourth frequency passband are the same.

15. The method according to claim 14, wherein the second and third frequency passbands are offset from the first and fourth frequency passbands.

16. The method according to claim 14, wherein the first frequency passband and the fourth frequency passband are in a V-band frequency range of about 57 GHz to about 66 GHz.

17. The method according to claim 12, wherein the second frequency passband is in a first E-band frequency range of about 71 GHz to about 76 GHz and the third frequency passband is in a second E-band frequency range of about 81 GHz to about 86 GHz.

18. The method according to claim 12, wherein the second frequency passband is in a first E-band frequency range of about 81 GHz to about 86 GHz and the third frequency passband is in a second E-band frequency range of about 71 GHz to about 76 GHz.

19. The method according to claim 12, wherein the second and third frequency passbands are offset from the first and fourth frequency passbands.

20. The method according to claim 12, wherein the transmitter for the first frequency passband and the transmitter for the second frequency passband are provided by a single transmitter, and the receiver for the third frequency passband and the receiver for the fourth frequency are provided by a single receiver.

* * * * *